United States Patent [19]

Lang

[11] 4,193,471
[45] Mar. 18, 1980

[54] POWER STEERING CONTROL WITH MAINTENANCE OF HYDRAULIC BLOCKING OF POWER CYLINDER

[75] Inventor: Armin Lang, Schwabisch-Gmund, Fed. Rep. of Germany

[73] Assignee: Patentburo Zahnradfabrik Friedrichshafen AG., Friedrichshafen, Fed. Rep. of Germany

[21] Appl. No.: 867,300

[22] Filed: Jan. 5, 1978

[51] Int. Cl.² ............................................. B62D 5/08
[52] U.S. Cl. ................................................ 180/154
[58] Field of Search ............... 180/152, 153, 154, 155, 180/156, 157, 158, 159, 160, 161, 162, 163; 60/386, 384; 418/61; 91/480, 375 A

[56] References Cited
U.S. PATENT DOCUMENTS

| | | | |
|---|---|---|---|
| 2,768,699 | 10/1956 | Gardiner | 180/156 |
| 3,497,032 | 2/1970 | Schott | 180/160 |
| 3,587,235 | 6/1971 | Goff et al. | 60/384 |
| 3,989,120 | 11/1976 | Lang et al. | 180/154 |

*Primary Examiner*—Joseph F. Peters, Jr.
*Assistant Examiner*—R. Schrecengost
*Attorney, Agent, or Firm*—Zalkind & Shuster

[57] ABSTRACT

A power steering multi-way control valve is provided featuring means for effecting hydraulic blocking of a power cylinder so that the wheels of the vehicle will remain in the neutral or steered angle position even though the driver removes his hands from the steering wheel in order to operate other accessories. This is necessary for heavy work vehicles in the construction industry or other vehicles used in open terrain.

5 Claims, 3 Drawing Figures

POWER STEERING CONTROL WITH MAINTENANCE OF HYDRAULIC BLOCKING OF POWER CYLINDER

In general, there are two conventional types of power steering control systems. In both such types the steering wheel returns to neutral straight ahead position as does the control valve automatically, and in a so called flow through system common in passenger vehicles the steered wheels of the vehicle likewise return to straight ahead position automatically. In the other type, hydraulic blocking of the power cylinder is provided after the steering wheel and control valve return to straight ahead or neutral position. In vehicles where the steered wheels resume the straight ahead position when no manual force is applied to the steering wheel, road shock occasioned by the steered wheels striking ground obstacles can cause erratic steering since there is no hydraulic blocking of the power cylinder which would otherwise hold the steered wheels at a desired steered angle. Such systems are acceptable in passenger vehicles where the vehicle is generally on a smooth road and the driver normally is holding the steering wheel. For off the road work vehicles, however, the advantages of hydraulic blocking on terrain which has obstacles that could force steered wheels out of the neutral or selected steered angle and cause shimmy are apparent, particularly since the driver can release the steering wheel to operate accessories of the vehicle.

In general, the invention herein is identical mechanically, except for the control valve, and to some extent hydraulically, to U.S. Pat. No. 3,989,120, issued to Lang and Liebert Nov. 2, 1976, assigned to the present assignee. However, the present invention relates to a modification of U.S. Pat. No. 3,989,120 to effect a simple and novel feature for effecting hydraulic blocking of the power cylinder, a feature not present in the prior patent. Details of mechanical or hydraulic operation which may be omitted to avoid repetitiousness for purposes of brevity herein will be found in the prior art patent aforementioned incorporated by reference herein.

Briefly, the present invention provides for automatic return of the steering wheel and control valve arrangement as in the aforementioned patent and includes the usual manually operated metering pump through which pressure fluid from an engine driven pump flows to the extent determined by rotation of the metering pump which is articulated through a torque rod to the steering spindle and thus to the steering wheel, all as is now known.

As noted above, the steered wheels of a road vehicle can be swung to one side or the other by contact with the road in pressure fluid control systems preferably used only in vehicles moving on solid or smooth roadways. It is desirable to have as good a contact as possible with the roadways whereby vehicles may be towed with little difficulty since the steering wheels will automatically assume a straight ahead position. In such flow through systems the hydraulic fluid powering the cylinder can flow reversibly through the control valve without being blocked. Further, in such systems, where a single pressure cylinder is used, the pressure chamber on the side of the cylinder through which the piston rod extends is of lesser volume than the other pressure chamber and, therefore, means are provided to draw in additional hydraulic fluid, e.g., oil, to fill the larger chamber when it is expanding. This is generally accomplished, as for example in the aforementioned patent, by way of bypass valving arranged to communicate between that chamber and the oil tank of the system to draw oil into the expanding chamber. However, where it is necessary to provide a control valve which in neutral position hydraulically blocks the pressure cylinder in neutral position through the control valve, bypass valving is not effective and cannot prevent development of a vacuum in the power cylinder chambers as hereinafter explained. Where such a vacuum occurs in neutral position of the control valve it can be filled only by manual movement of the steering wheel, a disadvantage overcome in the present invention for the neutral position of the hydraulic cylinder.

Thus, vacuum may develop due to leakage at the closed flow control edges of a neutrally positioned spool i.e., sleeve type control valve due to impact in a power cylinder pressure chamber where the piston receives a heavy impact compressing the oil in that chamber. Such vacuum may be rapidly increased with continued operation. For example, should the steered wheels encounter an obstacle forcing the piston of the power cylinder, say to the right, pressure is built up in the right hand pressure chamber of the cylinder and at the then overlapped, i.e., closed control edges of the lands between the valve sleeve and the coacting valve housing of a conventional multi-way valve. This results in leakage flow through the valve to the tank.

At this time in the left-hand pressure chamber of the power cylinder there is no pressure fluid flow thereto because of the blocking effect of the position of the control valve. Accordingly vacuum or in any event unfilled oil space occurs therein. Should the steered wheels now strike an obstacle whereby the force on the power piston is in the left-hand direction, then the piston will initially move into a pressure chamber containing a vacuum, thus finding no reaction support and moving unimpededly for a distance determined by the degree of leakage through the control valve which has occurred due to the first impact. The situation becomes cumulatively damaging since now the piston strikes heavily against the fluid in the left-hand pressure chamber which again causes leakage through the control valve and a vacuum now occurs in the opposite pressure chamber since flow thereto is blocked. This cumulative evacuating effect now occurring in both pressure chambers causes the power piston to flutter or hunt with ever increasing amplitude, a condition sometimes described as shimmy that could considerably impair driving safety.

The above deleterious effect as described could be corrected by means of bypass valves provided in flow lines to the pressure chambers and connecting to the system oil tank, such valving being check valves opening in the direction of the pressure chambers so as to supplement the fluid therein for avoidance of vacuum. However, that arrangement, apart from considerable additional expense, effects a risk since should a bypass valve fail the entire steering system would fail.

The present invention solves the problem by effecting in a simple manner hydraulic blocking of the power cylinder in its neutral position to prevent occurrence of vacuum with the control valve being in the neutral position.

This effect is accomplished without endangering driving safety and with a minimum of cost in construction. Thus, the steering operation of a power steering system with a hydraulically blocked power cylinder is considerably improved and the cumulative shimmy or vibration effected by pressure chamber vacuum or cavitation is substantially prevented.

A detailed description of the invention now follows in conjunction with the appended drawing in which.

Figure 1:
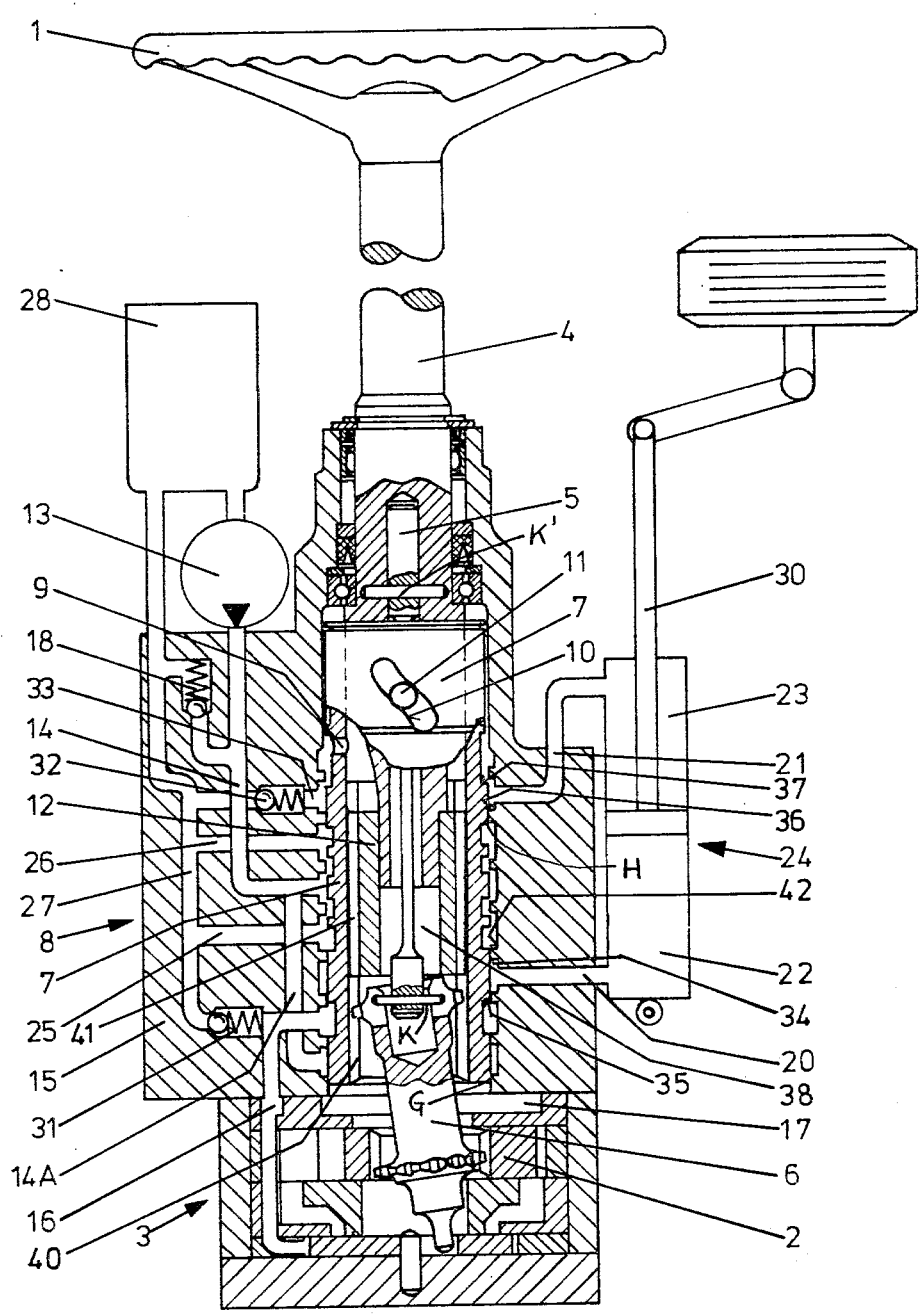
FIG. 1 is an elevation of a cross section showing the essential components of the invention, and, FIG. 2 is a hydraulic diagram showing the valving and the essential components of the hydraulic circuitry.

Referring to the drawing there is disclosed a steering wheel 1 and the rotor 2 of a manually operated metering pump 3. Pump 3 is operated by the steering spindle 4 through a torsion bar 5 and pump nutatory motion drive shaft 6 having geared engagement with rotor 2 in a known manner. A valve sleeve 7 of a servomotor control multiway valve means 8 has a radial bore 9 and provides flow control for power steering in a manner to be described. It should be noted at this time that flow can take place interiorly of valve sleeve 7 to or from bore 9 for a purpose to be described despite the presence of mechanical components in the valve sleeve.

The torsion bar 5 is keyed as shown to the spindle 4 as by the pin K and to the drive shaft 6 as by the pin K'. The latter pin K' is keyed in radial slots at the upper end of the drive shaft as shown.

A cam slot 10 is provided at the upper end of the valve sleeve 7 into which slot protrudes a cam pin 11 carried by the steering spindle 4 as by a force fit in a bore therein (not shown). Accordingly, rotation of the steering spindle 4 will effect, through the cam pin 11 and slot 10, reciprocation of the valve sleeve 7 in either direction, and will also effect rotation of metering pump rotor 2 through the torsion bar 5 while torque stressing that bar. The torque stress biases valve sleeve 7 to neutral position shown in FIG. 1.

The maximum angle of torsional twist between spindle 4, shaft 6 and valve sleeve 7 is limited by a sleeve 12 which serves as a lost motion coupling inside initially non-rotative valve sleeve 7 and is provided with a pair of teeth 41 which are diametrically opposed and engage teeth such as 40 disposed on the inner surface of valve sleeve 7. It will be understood that there is a pair of spaced teeth 40 for each tooth 41 so that rotation in either direction of drive shaft 6 is limited to the degree of spacing.

An engine operated servopump 13 provides steering booster pressure fluid to be fed via feed channels 14 or 14A in the housing 15, and via control valve means 8 to respective pressure chambers 16 or 17 of metering pump 3 dependent on direction of steering by rotation of steering wheel 1. From either chamber 16 or 17 pressure fluid proceeds to the control valve means 8 to be fed for directional steering control. The several lands and grooves of the valve sleeve 7 and housing 15 coact i.e., overlap or separate to effect control by valve means 8 for directional flow control, reference being made to FIG. 2, additional passage means and channels as required being provided in the housing 15 of the multiway valve means as connection means for the various flow control functions.

The operating pressure of servopump 13 is regulated to a maximum value by a pressure relief valve 18.

The metered flow output of pump 3 communicates via passage 20 or 21 under control of valve 8 dependent on the direction of steering through a respective pressure chamber 22 or 23 of servomotor 24, a double acting power steering cylinder.

Thus working pressure from either chamber 16 or 17 reaches a respective servomotor cylinder chamber 22 or 23 dependent on steering direction while exhaust from cylinder chambers 22 or 23 is effected pressurelessly via respective passage 20 or 21 under control of valve 8 to intermediate passages, respectively, 25 or 26 connecting with return passage 27 leading to tank 28.

The mechanical operating of the valve sleeve 7 by the steering wheel through the cam slot and cam pin is generally conventional, the torsion bar 5 serving to bias the valve sleeve for straight ahead steering position in a known manner and as heretofore mentioned.

Figure 2:
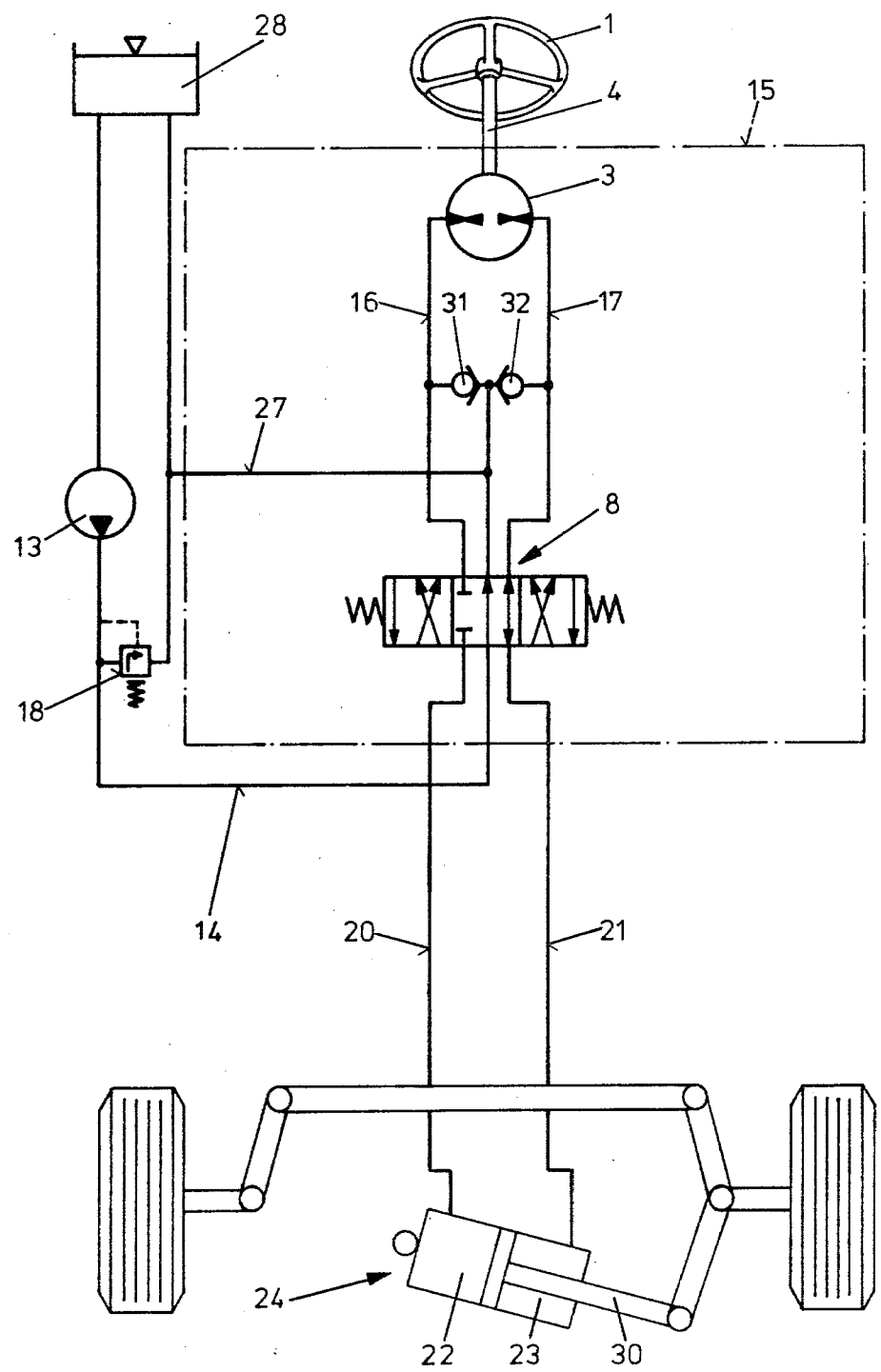
Figure 3:
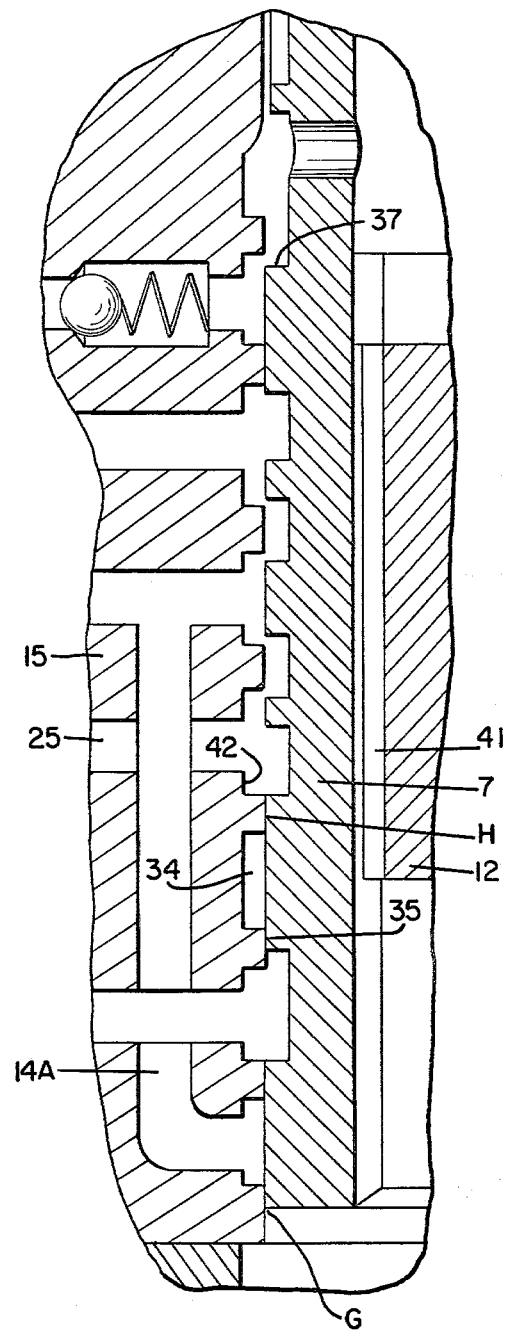
FIG. 3 is a fragmentary elevation of the particularly novel arrangement of coacting lands of the valve housing and valve sleeve.

With reference to FIGS. 1 and 2, more particularly, FIG. 1, valve sleeve 7 being in neutral position, oil under pressure from pump 13 flows by way of passage 14 via the open passage means noted between coacting lands and grooves of the housing 15 and valve sleeve 7 to passages 25 and 26 and thence via return passage 27 to tank 28. There is no other oil circulation in the system at this time.

Referring to the drawing, the invention operates conventionally as by rotating the metering pump 3 via steering wheel 1 and steering spindle 4 and thence torque rod 5 in order to shift valve sleeve 7 to pressurize and exhaust hydraulic cyliner chambers 22 and 23. In accordance with desired steering direction the shifting of the valve sleeve moves up or down to establish connections via respective pump chambers 16 or 17 and respective connecting channels 20 and 21 to respective pressure chambers 22 and 23. Exhaust oil from either of these pressure chambers flows at little or no pressure via a respective channel 20 or 21 through the control valve 8 and thence through a respective intermediate channel 25 or 26 to the return channel 27 leading to tank 28. Bypass valves 31 and 32 which close in the direction of the tank communicate with the return channel 27. Valve 31 connects so as to open flow to chamber 16 of the metering pump and valve 32 connects to channel 33 and groove 36 of the housing which will be seen to provide open gap 37 in coaction with a land on valve sleeve 7, in the neutral position shown.

For power steering, upon rotation of the hand operated steering wheel the cam pin and slot arrangement actuates valve sleeve 7, say, upwardly to open a gap at G so that fluid pressure feeds from channel 14 to channel 14A to pump chamber 17. Operation of metering pump 3 directs flow to pump chamber 16, the now open gap at 35, channel 20, cylinder chamber 22. Chamber 23 now exhausts via line 21, gap H, now open, and channel 26 to tank 28. The piston moves upwardly.

If hand wheel rotation is in the opposite direction, valve sleeve 7 moves downwardly. Fluid pressure now follows the course from channel 14 to channel 14A to pump chamber 16, thence via metering pump 3 to pump chamber 17 and to the interior space 38 of valve sleeve 7, thence through bore 9 to channel 21 and to cylinder chamber 23. Chamber 22 now exhausts via line 20, gap 34, now open, and channel 25 to the tank 28. The piston moves downwardly.

The bypass valves, in event of failure of engine driven pump 13, effect by virtue of dropping of pressure on their downstream sides the feeding of pressure oil to metering pump 3 from tank 28 so that manual power can be used for steering. Thus valve 31 feeds to chamber 16 and feed via valve 32 passes via gap 37 and bore 9 through the open interior 38 of valve sleeve 7 to metering pump chamber 17.

Where operation is normal with pressure from pump 13, valve 31 has the added function to permit entry of supplemental oil to hydraulic cylinder pressure chamber 22 which has a larger volume than pressure chamber 23 and therefore the exhaust from pressure chamber 22 is not sufficient to fill pressure chamber 22. This compensation for a difference in variable displacement chambers 22 and 23 has heretofore been known in the prior art.

The invention herein is characterized by making the valve sleeve 7 and housing 15 with coacting lands or edges to form flow control gaps, a pair of such lands being closed at gap 35 to block flow at the housing groove 34 which communicates via channel 20 with pressure chamber 22 of the hydraulic cylinder. Accordingly, that pressure chamber is hydraulically blocked at the control valve means, as illustrated in FIG. 2. On the other hand, the upper pressure chamber 23 communicates with annular groove 36 of the housing a pair of lands effecting gap 37 at the open edge of that groove and the adjacent valve sleeve land, all as evident in FIG. 1. Accordingly, pressure chamber 23 communicates via the gap 37, channel 21, bore 9 in valve sleeve 7, and the open interior 38 of the valve sleeve with the pressure chamber 17 of the metering pump 3. This normally open communication from chamber 23 to the metering pump results in hydraulic blocking of pressure chamber 23 at closed gap H and the bypass valve 32 as well as at the metering pump which cannot rotate to permit flow therethrough because, as seen on FIG. 2, the opposite chamber 16 is blocked at the control valve means 8 due to closure of the pair of coacting valving edges at 35.

Thus it will be understood that in the neutral position of the valve sleeve 7, both of the hydraulic cylinder chambers, 22 and 23, are hydraulically blocked.

It will be noted that in the event of failure of power driven pump 13, oil can be sucked into metering pump 3 by opening of either of the bypass valves 31 or 32 dependent on the direction of manual rotation, to operate power cylinder 24 for either steering direction, by manual force at the steering wheel.

In retrospect, the type of booster steering herein disclosed is entirely hydrostatic, having no mechanical (manual power) linkage from steering wheel to steered wheels and is the type conventionally used for slow moving off the road work vehicles having a speed of no more than 62 km./hr.

Thus, in the disclosed invention when the operator removes his hands from the steering wheel the control valve automatically returns to neutral and the operator's steering wheel is returned through its degree of play by torsion rod 5, a matter of 10° to 15°, leaving the operator's hands free.

Basically, therefore, the invention automatically prevents steered wheel vibration or flutter by virtue of the combination of the open gap at 37 and bypass valve 32 as to pressure chamber 23 to prevent cavitation and vacuum therein. Bypass valve 31, heretofore known for the purpose of compensating for the greater volume of chamber 22 achieves the effect for that chamber as in U.S. Pat. No. 3,989,120, having a system usable, but not exclusively, for cross-country terrain wherein directional steering sense is desirable.

OPERATION

In turning the hand steering wheel left or right the steering effect will occur in the known and usual manner described above starting from the neutral position of the valve sleeve 7 illustrated in FIGS. 1 and 2, by pressurization and exhaust at opposite ends of hydraulic cylinder 24.

This neutral or centered position of valve sleeve 7 will always result when there is no manual force acting on steering wheel 1 turning the steered wheels. In such neutral valve position flow of pressure oil from engine driven pump 13 is through channels 14 via open coacting edges of valve sleeve 7 and the housing and thence through housing 15 channels 25 and 26 and return channel 27 to tank 28, metering pump 3 not being actuated by the steering wheel at this time. However, when upon actuation, shift of valve sleeve 7 directs flow from pump 13 to metering pump 3 via channel 14A to either chamber 16 or 17 of the metering pump, depending on direction of valve sleeve shift. The piston of the hydraulic cylinder 24 is hydraulically blocked at this time as described above and the vehicle's wheels if in a steered position maintain the direction or angle of steering as set.

With the valve sleeve 7 in the neutral position, should an impact force such as a steered wheel striking something in its path occur, say, in a direction to suddenly increase pressure in pressure chamber 22 through piston rod 30, a leakage in the control valve can occur from the annular groove 34 of the housing to the housing channel 25 despite the closure of valve sleeve and housing lands between groove 34 and channel 25. Thus there is leakage back to return channel 27 and the tank 28. In order to prevent vacuum from developing in the opposite pressure chamber 23 due to the forced impact movement of the piston, bypass valve 32 opens to permit oil to be sucked into pressure chamber 23 via annular groove 36 of the housing, i.e., from channel 33 to channel 21. On the other hand, should an impact force on the steered wheels occur so as to produce compression in pressure chamber 23 and the subsequent leakage between the housing and the valve sleeve, bypass valve 32 will open again to permit flow into pressure chamber 23 preventing a vacuum forming there upon reversal of the impact force.

Accordingly, by the arrangement described, loss of oil resulting in vacuum and the erratic operation of the steered wheels which would thus be occasioned is precluded. The safety of the vehicle and certainty of maintaining a desired steering direction is considerably increase, it being noted that bypass valve 31, as heretofore described and as described on U.S. Pat. No. 3,989,120, is present to prevent vacuum forming in chamber 22.

In view of the fact that the control valve and housing are generally arranged on a vertical axis as shown in FIG. 1, it is desirable that the valve sleeve and housing lands at 35 be closed in neutral position and disposed below the open lands at 37. The reason is that the weight of the components will always ensure full closure at 35 in the neutral position of the control valve even though such weight causes slight downward movement of the valve sleeve 7 when the valve housing is in a preferred, i.e., vertical position when installed.

I claim:

1. In a booster steering system of the kind described comprising a flow control valve means having a valve sleeve (7) and housing (15) each having grooves effecting coacting lands and being relatively movable responsive to operator control from a neutral position to selectively open and close gaps for controlling flow of pressure and exhaust fluid with respect to the pressure chambers (22, 23) of a double acting power steering cylinder (24) having a piston between said pressure chambers, and comprising in said system a tank (28) source of fluid and said system having connection means for fluid flow responsive to relative position of said valve sleeve and housing; and means (5, 10, 11, etc.) for providing return movement between said valve sleeve and said housing to said neutral position following operator controlled movement thereof from said neutral position;

the improvement wherein said valve sleeve and housing have a pair of overlappable coacting lands (37) disengaged in said neutral position to effect an open gap operative to permit communication between one (23) said pressure chamber and said tank via said connection means with a one way check valve (32) blocking said communication to said tank but openable by suction from said pressure chamber to permit flow from said tank to said pressure chamber to maintain said one pressure chamber fluid filled in the event of leakage therefrom, said valve sleeve and housing having a pair of coacting overlapping lands effecting a closed gap (35) in said valve sleeve neutral position to block flow through said connection means from the other pressure chamber (22) to said tank, whereby said pressure chambers are hydraulically blocked in any steering operated position or neutral position when said valve sleeve is in neutral position.

2. In a system as set forth in claim 1, wherein said first mentioned pair of lands are spaced along the axis of said valve sleeve from said second mentioned pair of lands so that, when said valve means is installed in a vehicle with said first mentioned pair of lands in uppermost position said second mentioned pair of lands is lower than said first mentioned pair of lands, gravitational forces tending to move said valve sleeve downward to maintain said second mentioned gap (35) closed in the neutral position of said valve means.

3. In a booster steering system of the kind described as set forth in claim 1 wherein said other cylinder chamber has greater volume than said one cylinder chamber; and wherein is also included a bypass valve (31) in said connection means openable to provide flow from said tank (28) to said other cylinder chamber (22) to provide full filling thereof;

said improvement including in said connection means a return channel (27) communicating in said housing (15) with said valve sleeve (7) to provide communication between said cylinder chambers through said bypass valves (31, 32) to said tank wherein said channel (27) is a common connection to said tank for said bypass valves.

4. In a power steering system of the kind having a steering wheel operated metering pump (3) and a power driven pump (13) having output metered through said metering pump and including a multiway steering control valve means (8) operable in response to operation of said steering wheel and means (5, 10, 11, etc.) to restore said multiway valve means to a neutral position after a steering operation during which operation pressure fluid is fed to a cylinder chamber (22 or 23) of a double acting hydraulic power steering cylinder (24) while the other cylinder chamber (22 or 23) is being exhausted to a tank (28) and wherein said system comprises pressure chambers (16, 17) at respective sides of said metering pump connecting with respective cylinder chambers through said multiway valve means responsive to steering operation of said multiway valve means; and said multiway valve means having connection means to circulate flow between said power driven pump and said tank, when said multiway valve means is in neutral position; and said multiway valve means having a bypass valve (31) in a channel (27) intermediate one said metering pump pressure chamber (16) and said tank and operable by suction in one said cylinder chamber (22) to provide fluid from said tank through said metering pump to said one cylinder chamber during a steering operation to compensate for the difference in volume between said cylinder chambers wherein said one cylinder chamber has a larger volume than said other cylinder chamber; and said multiway valve means comprising a valve housing (15) and a valve sleeve (7) therein reciprocal by steering wheel movement for steering operations; and said housing and valve sleeve having grooves effecting adjacent coacting lands to open and close flow control gaps and connection means therefore to control flow selectively between said power driven pump, said tank, said metering pump, and said cylinder chambers for effecting flow control functions in steering operations or in neutral position of said multiway valve means;

the improvement which comprises a second bypass valve (32) in the connection means (27) intermediate said tank and a pair of said coacting lands of said housing and valve sleeve wherein said pair of lands are open to effect a flow gap (37) communicating with the other said cylinder chamber (23) when said multiway valve means is in neutral position with said hydraulic power cylinder and thus the steered wheels of a vehicle in a pressure operated steering position, so as to permit flow from said tank to break vacuum in said other cylinder chamber (23) by suction opening of said second bypass valve (32) in the event of loss of fluid in said other cylinder chamber (23); and a second pair of coacting lands of said housing and valve sleeve in the connection means (20) from said one cylinder chamber (22) to said multiway valve means and being engaged to effect a closure of a gap (35) when said multiway valve means is in neutral position and the steered wheels are in a steered position;

whereby a closed position of said second bypass valve (32) blocks flow from said other cylinder chamber (23) and said second pair of coacting lands blocks flow from said one cylinder chamber (22), to effect hydraulic blocking of movement of said steered wheels from a steered position.

5. In a system as set forth in claim 1, wherein a steering spindle (4) is articulated axially to said valve sleeve at an end thereof and wherein said first mentioned pair of lands are spaced along the axis of said valve sleeve from said second mentioned pair of lands with said second pair in a more distant position relative to said steering spindle so that, when said valve means is installed in a vehicle with said steering spindle in upright position said second pair is lower than said first pair, gravitational forces tending to move said valve sleeve downwards maintains said second mentioned gap (35) closed in the neutral position of said valve means.

* * * * *